United States Patent [19]

Lewis et al.

[11] 4,288,612

[45] * Sep. 8, 1981

[54] DEPOSIT CONTROL ADDITIVES

[75] Inventors: Robert A. Lewis, Berkeley; Lewis R. Honnen, Petaluma, both of Calif.

[73] Assignee: Chevron Research Company, San Francisco, Calif.

[*] Notice: The portion of the term of this patent subsequent to Nov. 25, 1997, has been disclaimed.

[21] Appl. No.: 144,797

[22] Filed: Apr. 28, 1980

Related U.S. Application Data

[63] Continuation of Ser. No. 917,427, Jun. 19, 1978, abandoned, which is a continuation-in-part of Ser. No. 891,879, Mar. 30, 1978, abandoned, which is a continuation-in-part of Ser. No. 801,444, May 27, 1977, abandoned, which is a continuation-in-part of Ser. No. 730,495, Oct. 7, 1976, abandoned, which is a continuation-in-part of Ser. No. 700,922, Jun. 29, 1976, abandoned, which is a continuation-in-part of Ser. No. 698,243, Jun. 21, 1976, abandoned.

[51] Int. Cl.$^3$ .................. C07C 125/04; C10L 1/22
[52] U.S. Cl. ........................ 560/159; 44/58; 44/63; 44/71; 260/465 D; 560/20; 560/26; 560/29; 560/33; 560/115; 560/156; 560/158
[58] Field of Search .............. 560/20, 26, 29, 33, 560/115, 156, 158, 159; 260/465 D; 44/58, 63, 71

[56] References Cited

U.S. PATENT DOCUMENTS

| | | | |
|---|---|---|---|
| 2,991,162 | 7/1961 | Malec | 44/71 X |
| 3,359,303 | 12/1967 | Coker et al. | 560/159 |
| 3,438,757 | 4/1969 | Honnen et al. | 44/58 |
| 3,454,625 | 7/1969 | Eiseman et al. | 560/159 |
| 3,565,592 | 2/1971 | Mehmedbasich | 44/71 X |
| 3,652,240 | 3/1972 | Dorn et al. | 44/71 X |
| 3,658,882 | 4/1972 | Eiseman | 260/463 X |
| 3,671,511 | 6/1972 | Honnen et al. | 44/58 X |
| 3,786,081 | 1/1974 | Oppenlaender et al. | 560/158 X |
| 3,813,341 | 5/1974 | Elliott et al. | 560/158 X |
| 3,960,515 | 6/1976 | Honnen | 44/63 X |
| 4,160,648 | 7/1979 | Lewis et al. | 44/71 X |
| 4,191,537 | 3/1980 | Lewis et al. | 44/71 |
| 4,198,306 | 4/1980 | Lewis | 44/71 X |

FOREIGN PATENT DOCUMENTS 855961 7/1977 Belgium.

*Primary Examiner*—Arthur P. Demers
*Attorney, Agent, or Firm*—D. A. Newell; A. Stephen Zavell

[57] ABSTRACT

Deposit control additives for internal combustion engines are provided which maintain cleanliness of intake systems without contributing to combustion chamber deposits. The additives are hydrocarbylpoly(oxyalkylene) aminocarbamates comprising a hydrocarbyl-terminated poly(oxyalkylene) chain of 2-5 carbon oxyalkylene units bonded through an oxycarbonyl group to a nitrogen atom of a diamine.

12 Claims, No Drawings

DEPOSIT CONTROL ADDITIVES

This is a continuation of U.S. application Ser. No. 917,427, filed June 19, 1978, now abandoned, which in turn is a continuation-in-part of U.S. application Ser. No. 891,879, filed Mar. 30, 1978, now abandoned, which in turn is a continuation-in-part of Ser. No. 801,444, filed May 27, 1977, now abandoned, which in turn is a continuation-in-part of U.S. Ser. No. 730,495, filed Oct. 7, 1976, now abandoned, which in turn is a continuation-in-part of Ser. No. 700,922, filed June 29, 1976, now abandoned, which in turn is a continuation-in-part of Ser. No. 698,243, filed June 21, 1976, now abandoned.

BACKGROUND OF THE INVENTION

1. Field of the Invention

In recent years, numerous fuel detergents or "deposit control" additives have been developed. These materials when added to hydrocarbon fuels employed in internal combustion engines effectively reduce deposit formation which ordinarily occurs in carburetor ports, throttle bodies, venturies, intake ports and intake valves. The reduction of these deposit levels has resulted in increased engine efficiency and a reduction in the level of hydrocarbon and carbon monoxide emissions.

Thus, the introduction of fuel compositions containing deposit control additives has resulted in many cases in the reduction of harmful atmospheric pollutants and, since greater engine efficiencies are maintained, fuel savings.

A complicating factor has, however, recently arisen. With the advent of automobile engines that require the use of non-leaded gasolines (to prevent disablement of catalytic converters used to reduce emissions), it has been difficult to provide gasoline of high enough octane to prevent knocking and the concomitant damage which it causes. The chief problem lies in octane requirement increase, herein called "ORI", which is caused by deposits formed in the combustion chamber while the engine is operating on commercial gasoline.

The basis of the ORI problem is as follows: each engine, when new, requires a certain minimum octane fuel in order to operate satisfactorily without pinging and/or knocking. As the engine is operated on any gasoline, this minimum octane increases and, in most cases, if the engine is operated on the same fuel for a prolonged period will reach equilibrium. This is apparently caused by an amount of deposits in the combustion chamber. Equilibrium is typically reached after 5000 to 15,000 miles of automobile operation.

Octane requirement increase, measured in particular engines with commercial gasolines, will vary at equilibrium from 5 or 6 octane units to as high as 12 or 15 units, depending upon the gasoline compositions, engine design and type of operation. The seriousness of the problem is thus apparent. A typical 1975 or 1976 automobile with a research octane requirement of 85 when new may after a few months of operation require 97 research octane gasoline for proper operation, and little unleaded gasoline of that octane is available. The ORI problem exists in some degree with engines operated on leaded fuels. U.S. Pat. Nos. 3,144,311 and 3,146,203 disclose lead-containing fuel compositions having reduced ORI properties.

It is believed, however, by many experts that the ORI problem, while present with leaded gasolines, is much more serious with unleaded fuel because of the different nature of the deposits formed with the respective fuels, the size of increase, and because of the lesser availability of high-octane non-leaded fuels. This problem is compounded by the fact that the most common means of enhancing the octane of unleaded gasoline, increasing its aromatic content, also appears to increase the eventual octane requirement of the engine. Furthermore, some of the presently used nitrogen-containing deposit control additives and the mineral oil or polymer carriers commonly used with such additives appear to contribute significantly to the ORI of engines operated on unleaded fuel.

It is, therefore, highly desirable to provide deposit control additives which effectively control deposits in intake systems (carburetor, valves, etc.) of engines operated with fuels containing them, but do not contribute to the combustion chamber deposits which cause increased octane requirements.

DESCRIPTION OF THE PRIOR ART

U.S. Pat. No. 3,359,303 discloses reaction products of polyalkyleneoxy alkyl 1-aziridine carboxylates with polyamines. These materials are disclosed as being curing agents (cross-linking agents) for epoxy resins. The alkyleneoxy chains contain a maximum of 20 alkyleneoxy units. U.S. Pat. No. 3,658,882 discloses certain aryl carbamates and quaternary derivatives thereof useful as antistatic agents. Belgian Patent 855,961, granted July 15, 1977 (the Belgian counterpart of U.S. application Ser. No. 801,444, filed May 27, 1977, and related applications) disclose compounds suitable for deposit control in fuel compositions which are hydrocarbylpoly(oxyalkylene) aminocarbamates of ethylene diamine.

SUMMARY OF THE INVENTION

Deposit control additives are provided which are hydrocarbylpoly(oxyalkylene) aminocarbamates having a molecular weight of about 600–10,000; wherein said hydrocarbylpoly(oxyalkylene) moiety is composed of oxyalkylene units selected from $C_2$–$C_5$ oxyalkylene units of which a sufficient number are branched chain oxyalkylene units to render said carbamate soluble in liquid hydrocarbons; said hydrocarbyl group contains from 1 to 30 carbon atoms; and said amine moiety is derived from a diamine of from 1 to 24 carbon atoms.

DETAILED DESCRIPTION OF THE INVENTION

The poly(oxyalkylene) aminocarbamate of the present invntion consists of an amine moiety, and a poly(oxyalkylene) moiety (comprising at least one hydrocarbyl-terminated poly(oxyalkylene) polymer) bonded through a carbamate linkage, i.e.,

The poly(oxyalkylene) component of the carbamate is selected to provide solubility in liquid hydrocarbons, i.e., solubility in hydrocarbons boiling in the gasoline range, and/or solubility in oils of lubricating viscosity.

AMINE COMPONENT

The amine moiety of the hydrocarbyl-terminated poly(oxyalkylene) aminocarbamate is preferably derived from a diamine, i.e., an amine having two amine nitrogen atoms and from 1 to about 24 carbon atoms. The diamine is preferably reacted with a hydrocarbyl-poly(oxyalkylene) chloroformate to produce the hydrocarbylpoly(oxyalkylene) aminocarbamate fuel additive finding use within the scope of the present invention. The chloroformate is itself derived from hydrocarbylpoly(oxylkylene) alcohol by reaction with phosgene. Preferably, the diamine provides the product poly(oxyalkylene) aminocarbamate with, on the average, at least about one basic nitrogen atom per carbamate molecule, i.e., a nitrogen atom titratable by a strong acid.

The diamine may be substituted with substituents selected from (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C). "Lower", as used in terms like lower alkyl or lower alkoxy, means a group containing from 1 to about 6 carbon atoms. At least one of the substituents on one of the basic nitrogen atoms of the diamine is hydrogen, e.g., at least one of the basic nitrogen atoms of the diamine is a primary or secondary amino nitrogen.

Hydrocarbyl, as used in describing all the components of this invention, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylenic and acetylenic, particularly acetylenic unsaturation. The substituted diamines of the present invention are generally, but not necessarily, N-substituted diamines. Exemplary hydrocarbyl groups and substituted hydrocarbyl groups include alkyls such as methyl, ethyl, propyl, butyl, isobutyl, pentyl, hexyl, octyl, etc., alkenyls such as propenyl, isobutenyl, hexenyl, octenyl, etc., hydroxyalkyls, such as 2-hydroxyethyl, 3-hydroxypropyl, hydroxy-isopropyl, 4-hydroxybutyl, etc., ketoalkyls, such as 2-ketopropyl, 6-ketooctyl, etc., alkoxy and lower alkenoxy alkyls, such as ethoxyethyl, ethoxypropyl, propoxyethyl, propoxypropyl, 2-(2-ethoxyethoxy)ethyl, 2-(2-(2-ehtoxyethoxy)ethoxy)ethyl, 3,6,9,12-tetraoxatetradecyl, 2-(2-ethoxyethoxy)hexyl, etc. The acyl groups of the aforementioned (C) substituents are such as propionyl, acetyl, etc. The more preferred substitutents are hydrogen, $C_1$-$C_6$ alkyls and $C_1$-$C_4$ hydroxyalkyls.

In a substituted diamine the substituents are found at any atom capable of receiving them. The substituted atoms, e.g., substituted nitrogen atoms, are generally geometrically inequivalent, and consequently the substituted amines finding use in the present invention can be mixtures of mono- and poly-substituted diamines with substituent groups situated at equivalent and/or inequivalent atoms.

The more preferred diamine finding use within the scope of the present invention is an alkylene diamine, and including substituted diamines, e.g., alkyl and hydroxyalkyl-substituted dialkylene diamine. Preferably, the alkylene group contains from 2 to 6 carbon atoms, there being preferably from 2 to 3 carbon atoms between the nitrogen atoms. Such groups are exemplified by ethylene, 1,2-propylene, 2,2-dimethyl-propylene, trimethylene, 1,3,2-hydroxy-propylene, etc. Examples of such diamines include ethylene diamine, propylene diamine, trimethylene diamine, hexamethylene diamine, etc. Such amines encompass isomers such as branched-chain diamines and the previously mentioned previously mentioned substituted diamines, including hydroxy- and hydrocarbyl-substituted diamines. Among the alkylene diamines, ethylene diamine is especially preferred.

The amine component of the poly(oxyalkylene) aminocarbamate also may be derived from heterocyclic diamines, heterocyclic substituted amines and substituted heterocyclic compounds, wherein the heterocycle comprises one or more 5-6 membered rings containing oxygen and/or nitrogen. Such heterocycles may be saturated or unsaturated and substituted with groups selected from the aforementioned (A), (B), (C) and (D). The heterocycles are exemplified by piperazines, such as 2-methylpiperazine, and N-(2-hydroxyethyl)piperazine, 2-methylimidazoline, 3-aminopiperidine, 2-aminopyridine, 2-(3-aminoethyl)-3-pyrroline, 3-aminopyrrolidine, N-(3-aminopropyl)-morpholine, etc. Among the heterocyclic compounds, the piperazines are preferred.

Typical diamines that can be used to form the compounds of this invention by reaction with a poly(oxyalkylene)chloroformate include the following: ethylene diamine, 1,2-propylene diamine, 1,3-propylene diamine, hexamethylene diamine, N-(beta-aminoethyl)piperidine, 3-amino-N-ethylpiperidine, N-(beta-aminoethyl)-morpholine, N,N'-di(beta-aminoethyl)imidazolidone-2, N-(beta-cyanoethyl)ethane-1,2-diamine, N-(beta-aminoethyl)diethanolamine, N-acetonyl-1,2-propanediamine, N-(beta-nitroethyl)-1,3-propane diamine, 5-(beta-aminoethy)-1,3,5-dioxazine, 2-(2-aminoethylamino)ethanol.

The amine component of the poly(oxyalkylene) aminocarbamate may also be derived from an amine-containing compound which is capable of reacting with a hydrocarbylpoly(oxyalkylene) alcohol to produce a hydrocarbylpoly(oxyalkylene) aminocarbamate. For example, a substituted aminoisocyanate, such as $(R)_2NCH_2CH_2NCC$, wherein R is, for example, a hydrocarbyl group, reacts with the alcohol to produce the aminocarbamate additive finding use within the scope of the present invention. Typical aminoisocyanates that may be used to form the fuel additive compounds of this invention by reaction with a hydrocarbylpoly(oxyalkylene) alcohol include the following: N,N-(dimethyl)aminoisocyanatoethane, generally, N,N-(dihydrocarbyl)aminoisocyanatoalkane, N,N-(dimethyl)aminoisocyanatobenzene, etc.

In many instances the amine used as a reactant in the production of the carbamate of the present invention is not a single compound but a mixture in which one or several compounds predominate with the average composition indicated. For example, ethylene diamine prepared by the reaction of dichloroethylene and ammonia will have other amine members, e.g., triethylene tetramine, substituted piperazines, etc., but the composition will be mainly ethylene diamine. Finally, in preparing the compounds of this invention, where the nitrogen atoms of the diamine are not geometrically equivalent, several substitutional isomers are possible and are encompassed within the final products. Methods of preparation of amines, isocyanates and their reactions are detailed in Sidgewick's "The Organic Chemistry of Nitrogen," Clarendon Press, Oxford, 1966; Noller's "Chemistry of Organic Compounds," Saunders, Philadelphia, 2nd Ed., 1957; and Kirk-Othmer's "Encyclopedia of Chemical Technology," 2nd Ed., especially Volume 2, pp. 99-116.

POLY(OXYALKYLENE) COMPONENT

The hydrocarbyl-terminated poly(oxyalkylene) polymers which are utilized in preparing the carbamates of the present invention are monohydroxy compounds, i.e., alcohols, often termed monohydroxy polyethers, or polyalkylene glycol monohydrocarbylethers, or "capped" poly(oxyalkylene) glycols and are to be distinguished from the poly(oxyalkylene) glycols (diols), or polyols, which are not hydrocarbyl-terminated, i.e., not capped. The hydrocarbyl-terminated poly(oxyalkylene) alcohols are produced by the addition of lower alkylene oxides, such as oxirane, ethylene oxide, propylene oxide, the butylene oxides, or the pentylene oxides to the hydroxy compound ROH under polymerization conditions, wherein R is the hydrocarbyl group which caps the poly(oxyalkylene) chain. Methods of production and properties of these polymers are disclosed in U.S. Pat. Nos. 2,841,479 and 2,782,240, and the aforementioned Kirk-Othmer's "Encyclopedia of Chemical Technology," Volume 19, p. 507. In the polymerization reaction a single type of alkylene oxide may be employed, e.g., propylene oxide, in which case the product is a homopolymer, e.g., a poly(oxypropylene) propanol. However, copolymers are equally satisfactory and random copolymers are readily prepared by contacting the hydroxyl-containing compound with a mixture of alkylene oxides, such as a mixture of propylene and butylene oxides. Block copolymers of oxyalkylene units also provide satisfactory poly(oxyalkylene) polymers for the practice of the present invention. Random polymers are more easily prepared when the reactivities of the oxides are relatively equal. In certain cases, when ethylene oxide is copolymerized with other oxides, the higher reaction rate of ethylene oxide makes the preparation of random copolymers difficult. In either case, block copolymers can be prepared. Block copolymers are prepared by contacting the hydroxyl-containing compound with first one alkylene oxide, then the others in any order, or repetitively, under polymerization conditions. A particular block copolymer is represented by a polymer prepared by polymerizing propylene oxide on a suitable monohydroxy compound to form a poly(oxypropylene) alcohol and then polymerizing butylene oxide on the poly(oxypropylene) alcohol.

In general, the poly(oxyalkylene) polymers are mixtures of compounds that differ in polymer chain length. However, their properties closely approximate those of the polymer represented by the average composition and molecular weight.

The hydrocarbylpoly(oxyalkylene) moiety of the carbamate consists of one or more hydrocarbyl-terminated poly(oxyalkylene) polymers composed of oxyalkylene units containing from 2 to about 5 carbon atoms. The polymers are bound to the aminocarbamate via the oxygen atom of carbamate linkages, and the poly(oxyalkylene) moiety consists of at least one such poly(oxyalkylene) polymer. The hydrocarbyl group contains from 1 to about 30 carbon atoms, preferably from 2 to about 20 carbon atoms. Preferably the oxyalkylene units contain from 3 to 4 carbon atoms and the molecular weight of the hydrocarbyl poly(oxyalkylene) moiety is from about 500 to about 10,000, more preferably from about 500 to about 5,000. Each poly(oxyalkylene) polymer contains at least about 5 oxyalkylene units, preferably 8 to about 100 oxyalkylene units, more preferably about 10-100 units and most preferably 10 to about 25 such units. In general, the oxyalkylene units may be branched or unbranched. Preferably the poly(oxyalkylene) polymer chain contains at least some $C_3-C_5$ oxyalkylene units, more preferably branched $C_3-C_5$ oxyalkylene units are present in at least sufficient number to render the hydrocarbyl-terminated poly(oxyalkylene) aminocarbamate soluble in liquid hydrocarbons. This solubility condition is satisfied if the carbamate is soluble in hydrocarbons boiling in the gasoline range, at least to the extent of about 30-2,000 ppm by weight, and/or in hydrocarbon oils of lubricating viscosity at least to the extent of 0.01-5 weight percent. A poly(oxyalkylene) polymer chain composed of branched three and/or four carbon oxyalkylene units in at least sufficient amount to effect solubility in a fuel composition is most preferred. The structures of the $C_3-C_5$ oxyalkylene units are any of the isomeric structures well known to the organic chemist, e.g., n-propylene, $-CH_2CH_2CH_2-$; isopropylene, $-C(CH_3)CH_2-$; n-butylene, $-CH_2CH_2CH_2CH_2-$; sec.-butylene, $-CH(CH_2CH_3)CH_2-$; tert.-butylene, $-C(CH_3)_2CH_2-$; disec.-butylene, $-CH(CH_3)CH(CH_3)-$; isobutylene, $-CH_2CH(CH_3)CH_2-$; etc. The preferred poly(oxyalkylene) compounds are composed, at least in part, of the branched oxyalkylene isomers, particularly oxy(isopropylene), and oxy(sec.-butylene) units which are obtained from 1,2-propylene oxide and from 1,2-butylene oxide, respectively.

The hydrocarbyl moiety (R-) which terminates the poly(oxyalkylene) chain contains from 1 to about 30 carbon atoms, preferably from 2 to about 20 carbon atoms, and is generally derived from the monohydroxy compound (ROH) which is the initial site of the alkylene oxide addition in the polymerization reaction. Such monohydroxy compounds are preferably aliphatic or aromatic alcohols of from 1 to about 30 carbon atoms, more preferably an alkanol or an alkylphenol, and most preferably an alkylphenol wherein the alkyl is a straight or branched chain of from 1 to about 24 carbon atoms. One such preferred alkyl group is obtained by polymerizing propylene to an average of 4 units and has the common name of propylene tetramer. The preferred material may be termed either an alkylphenylpoly(oxyalkylene) alcohol or a polyalkoxylated alkylphenol.

HYDROCARBYLPOLY(OXYALKYLENE) AMINOCARBAMATE

Having described the amine component and the poly(oxyalkylene) component, the poly(oxyalkylene) aminocarbamate additive of the present invention is obtained by linking these components together through a carbamate linkage, i.e.,

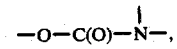

wherein the oxygen may be regarded as the terminal hydroxyl oxygen of the poly(oxyalkylene) alcohol component, and the carbonyl group, $-C(O)-$, is preferably provided by a coupling agent, e.g., phosgene. In the preferred method of preparation, the hydrocarbylpoly(oxyalkylene) alcohol is reacted with phosgene to produce a hydrocarbylpoly(oxyalkylene) chloroformate. The chloroformate is reacted with a diamine. The carbamate linkages are formed as the poly(oxyalkylene) chains are bound to the nitrogen of the diamine through the oxycarbonyl group (—O—C(O)—) of the chloroformate. Since there may be more than one nitrogen atom of the diamine which is capable of reacting with the chloroformate, the hydrocarbylpoly(oxyalkylene) aminocarbamate contains at least one hydrocarbylpoly(oxyalkylene) polymer chain bonded through an oxycarbonyl group to a nitrogen atom of the diamine, but the carbamate may contain from 1 to 2 such chains. It is preferred that the hydrocarbylpoly(oxyalkylene) aminocarbamate product contain, on the average, about 1 poly(oxyalkylene) chain per molecule (i.e., mono carbamate), although it is understood that this reaction route may lead to mixtures containing appreciable amounts of di-poly(oxyalkylene) chain substitution on a diamine containing two reactive nitrogen atoms (i.e., dicarbamate). To avert di-substitution on the diamine, a large excess of diamine may be contacted with the chloroformate. Alternatively, a monoisocyanate-substituted amine may be reacted directly with the poly(oxyalkylene) alcohol. The dicarbamate produced by the reaction of a diamine with two molecules of hydrocarbylpoly(oxyalkylene) chloroformate is to be distinguished from the dicarbamate produced by the reaction of a poly(oxyalkylene) di(chloroformate) with two moles of the same diamine. For purposes of distinction, the latter dicarbamate will be called the "bis(aminocarbamate)", and the former simply "dicarbamate". The bis(aminocarbamate), i.e., that derived from a poly(oxyalkylene) glycol, has been shown to be deleterious in fuel compositions, while the dicarbamate, i.e., that produced from the hydrocarbyl-terminated poly(oxyalkylene) alcohol, is at best an effective deposit control additive in fuel compositions.

The hydrocarbylpoly(oxyalkylene) aminocarbamate of the present invention preferably has at least about one basic nitrogen atom per molecule. A "basic nitrogen atom" is one that is titratable by a strong acid, e.g., a primary, secondary or tertiary amino nitrogen, as distinguished from, for example, amido nitrogens,

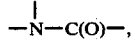

which are not so titratable. Preferably, the basic nitrogen atom is in a primary or secondary amino group.

The preferred hydrocarbylpoly(oxyalkylene) aminocarbamate has a molecular weight of from about 600 to about 10,000 (representing an average maximum disubstitution of poly(oxyalkylene) polymer in the carbamate) and more preferably from about 1,200 to about 5,000.

A class of preferred carbamates may be described by the following general formula:

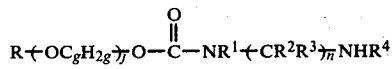

wherein n is an integer from 1 to 12, g is an integer from 2 to 5, j is an integer such that the molecular weight of the compound is in the range of about 600 to about 5,000, R is a hydrocarbyl group of from 1 to 30 carbon atoms, $R^1$, $R^2$, $R^3$, and $R^4$ are the same or different monovalent substituents selected from the group consisting of the aforementioned (A), (B), (C), and (D); and at least a sufficient number of the oxyalkylene units ($OC_gH_{2g}$) are branched chain oxyalkylene units to render said compound soluble in liquid hydrocarbons. Preferably $R^1$, $R^2$, $R^3$, and $R^4$ are H, j is about 5–25, g is 4, and n is 2–6.

PREPARATION OF THE POLYETHER AMINO CARBAMATES

The additives of this invention may be most conveniently prepared, as has been previously noted, by reaction of phosgene with the monohydroxy poly(oxyalkylene) alcohol followed by reaction of the product with diamine.

Bis(aminocarbamates), which we have made by reacting phosgene with an "uncapped" poly(oxyalkylene) diol followed by reaction with diamine, have been found to have no deposit control activity; in fact, they may contribute significantly to valve deposits.

The reaction of the poly(oxyalkylene) compound and phosgene is usually carried out on an essentially equimolar basis, although excess phosgene can be used to improve the degree of reaction. The reaction may be carried out at temperatures from $-10°$ to $100°$ C., preferably in the range of $0°$ to $50°$ C. The reaction will usually be complete within ¼ to 5 hours. Times of reaction will usually be in the range of from 2 to 4 hours.

A solvent may be used in the chloroformylation reaction. Suitable solvents include benzene, toluene, etc.

The reaction of the resultant chloroformate with the amine may be carried out neat or preferably in solution. Temperatures of from $-10°$ to $200°$ C. may be utilized. the desired product may be obtained by water wash and stripping, usually by the aid of vacuum, of any residual solvent.

The mol ratio of the basic amine nitrogen to polyether chloroformate will generally be in the range from about 2 to 20 mols of basic amine nitrogen per mol of chloroformate, and more usually 5 to 15 mols of basic amine nitrogen per mol of chloroformate. Since suppression of polysubstitution of the alkylene diamines is usually desired, large mol excesses of the amine will be used. For example, in particular, preparation with ethylenediamine with a diamine nitrogen to chloroformate ratio of 2.5 to 1 has yielded a basic nitrogen to total nitrogen ratio in the product of 0.27, whereas raising the diamine nitrogen to chloroformate ratio to 9.1 to 1 gives 0.42 basic nitrogen to total nitrogen ratio, showing a much higher amount of monocarbamate in the material.

The reaction or reactions may be conducted with or without the presence of a reaction solvent. A reaction solvent is generally employed whenever necessary to reduce the viscosity of the reaction product. These solvents should be stable and inert to the reactants and reaction product. Preferred solvents include aliphatic or aromatic hydrocarbons. Depending on the temperature of the reaction, the particular chloroformate used, the mol ratios, as well as the reactant concentrations, the reaction time may vary from less than 1 minute to 3 hours.

After the reaction has been carried out for a sufficient length of time, the reaction mixture may be subjected to extraction with a hydrocarbon-water or hydrocarbon-alcohol-water medium to free the product from any low-molecular-weight amine salts which have formed and any unreacted diamine. The product may then be isolated by evaporation of the solvent. Small amounts of halogen may be present as the hydrohalide salt of the polyether amino carbamates.

Depending on the particular application of the composition of this invention, the reaction may be carried out in the medium in which it will ultimately find use, e.g. polyether carriers or an oleophilic organic solvent or mixtures thereof and be formed at concentrations which provide a concentrate of a detergent composition. Thus, the final mixture may be in a form to be used directly for blending in fuels.

Although the aminocarbamte of the present invention has been described in terms of amine and poly(oxyalkylene) components coupled via a chloroformylation reaction utilizing phosgene, as is known to those of skill in the art, there are other methods of preparing carbamates which use other reactants. For example, the reaction of an isocyanate with an alcohol such as the hydroxycarbylpoly(oxyalkylene) alcohol described above also produces a carbamate. Monoisocyanato amines are produced, for example, by the methods of U.S. Pat. No. 3,644,490. Consequently, it is, for example, within the skill of the art to use a selected isocyanate-substituted monoamine to react directly with said poly(oxyalkylene) alcohol to produce a carbamate within the scope of the present invention. This route may be exemplified by the reaction of $(CH_3)_2NCH_2CH_2N=C=O$ with a hydrocarbylpoly(oxyalkylene) alcohol to produce a carbamate characteristic of the present invention.

FUEL COMPOSITIONS

The polyether aminocarbamates will generally be employed in a hydrocarbon distillate fuel. The proper concentration of additive necessary in order to achieve the desired detergency and dispersancy varies depending upon the type of fuel employed, the presence of other detergents, dispersants and other additives, etc. Generally, however, from 30 to 2000 weight parts per million, preferably from 100 to 500 ppm of polyetheraminocarbamate per part of base fuel is needed to achieve the best results. When other detergents are present, a lesser amount of polyether aminocarbamate may be used. For performance as a carburetor detergent only, lower concentrations, for example 30 to 70 parts per million may be preferred.

The deposit control additive may be formulated as a concentrate, using an inert stable oleophilic organic solvent boiling in the range of about 150° to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the detergent-dispersant additive. In the concentrate, the amount of the additive will be ordinarily at least 10 percent by weight and generally not exceed 70 percent by weight, preferably 10–50 weight percent and most preferably from 10 to 25 weight percent.

In gasoline fuels, other fuel additives may also be included such as antiknock agents, e.g., methylcyclopentadienyl manganese tricarbonyl, tetramethyl or tetraethyl lead, or other dispersants or detergents such as various substituted succinimides, amines, etc. Also included may be lead scavengers such as aryl halides, e.g., dichlorobenzene or alkyl halides, e.g., ethylene dibromide. Additionally, antioxidants, metal deactivators and demulsifiers may be present.

A particularly useful additive is a fuel-soluble carrier oil. Exemplary carrier oils include nonvolatile poly(oxyalkylene) compounds; other synthetic lubricants or lubricating mineral oil. Preferred carrier oils are poly(oxyalkylene) alcohols, diols (glycols) and polyols used singly or in mixtures, such as the Pluronics marketed by BASF Wyandotte Corp., and the UCON LB-series fluids marketed by Union Carbide Corp. When used, these carrier oils are believed to act as a carrier for the detergent and assist in removing and retarding deposits. They have been found to display synergistic effects when combined with certain hydrocarboxypoly(oxyalkylene) aminocarbamates. They are employed in amounts from about 0.005 to 0.5 percent by volume, based on the final gasoline composition. Preferably 100–5000 ppm by weight of a fuel soluble poly(oxyalkylene) alcohol, glycol or polyol is used as carrier oil. In the previously described concentrate the poly(oxyalkylene) alcohol, diols (glycols) and polyols are usually present in amounts of from 5 to 80 percent by weight. A particularly preferred poly(oxyalkylene) carrier oil is poly(oxypropylene) alcohol, glycol or polyol, especially the alcohol, e.g., a ($C_1$–$C_{10}$ hydrocarbyl)poly(oxypropylene) alcohol.

EXEMPLIFICATION

The following examples are presented to illustrate specific embodiments of the practice of this invention and should not be interpreted as limitations upon the scope of the invention.

EXAMPLE 1

Preparation of Poly(oxypropylene) Chloroformate

Phosgene (298 g, 3.0 mols) was condensed into toluene (2.5 liters) at 0° C. n-Butyl capped poly(oxypropylene)monool (5.0 kg, 2.78 mols) with a molecular weight of about 1800 was added to the phosgene solution in a rapid stream, with stirring. The mixture was stirred an additional 30 minutes after completion of the addition, and excess phosgene was removed by purging with nitrogen while the temperature rose to ambient (about 2 hours). The product showed a strong chloroformate absorption at 1790 cm$^{-1}$.

EXAMPLE 2

Reaction of Poly(oxypropylene) Chloroformate with Ethylenediamine

The chloroformate solution from Example 1 was divided in half, diluted with toluene (6 liters), and each half was added to ethylenediamine (527 g, 8.6 mol) in toluene (1 liter) at 0° C., with vigorous stirring. Immediate precipitation of ethylenediamine hydrochloride occurred. The reaction temperature was kept below 25° C. and stirring was continued for one hour after addition. n-Butanol (5 liters) was added, and the mixture was extracted with hot water (approximately 15 liters). The two batches were combined and solvent was removed on a 5-gallon rotary evaporator. The product (5050 g), i.e., n-butylpoly(oxypropylene)-N-(2-aminoethyl)carbamate, contained 1.12% nitrogen and 0.46% basic nitrogen by ASTM D-2896. Infrared analysis revealed a typical carbamate absorption at 1725 cm$^{-1}$.

The polyether aminocarbamates were blended in gasoline and their deposit reducing capacity tested in an ASTM/CFR Single-Cylinder Engine Test.

In carrying out the tests, a Waukesha CFR single-cylinder engine is used. The run is carried out for 15 hours, at the end of which time the intake valve is removed, washed with hexane and weighed. The previously determined weight of the clean valve is substracted from the weight of the valve. The differences between the two weights is the weight of the deposit with a lesser amount of deposit measured connoting a superior additive. The operating conditions of the test are as follows: water jacket temperature 100° C. (212° F.); manifold vacuum of 12 in Hg, intake mixture temperature of 50.2° C. (125° F.); air-fuel ratio of 12; ignition spark timing of 40° BTC; engine speed is 1800 rpm; the crankcase oil is a commercial 30W oil. The amount of carbonaceous deposit in milligrams on the intake valves is measured and reported in the following Table I.

The base fuel tested in the above extended detergency test is a regular octane unleaded gasoline containing no fuel detergent. The base fuel is admixed with varying amounts of deposit control additives.

TABLE I

INTAKE VALVE DEPOSIT TESTS[1]

| Additive Carrier Description | ppm | Average Washed Deposit, mg | |
|---|---|---|---|
| | | 11A Engine | 12A Engine |
| Base Fuel | — | 259[2] | 102[3] |
| PPG-1800[4] EDA Carbamate[5] | 333 | 12 | 6 |
| PPG-1800[4] | 167 | | |
| PPG-1800[4] EDA Carbamate[5] | 200 | 33 | 18 |
| PPG-1450[4] | 300 | | |

[1]Single evaluations unless noted
[2]Average of 8 runs
[3]Average of 4 runs
[4]The designation PPG-1800 refers to a monobutylcapped poly(oxypropylene) alcohol of about 1800 molecular weight; PPG 1450 is 1450 molecular weight.
[5]Poly(oxypropylene) ethylene diamine carbamate prepared as in Example 2.

These data show that the additives of this invention have excellent deposit control properties.

In order to compare the compounds of this invention with compounds prepared from polyether diols, bis-amino-carbamates were prepared as follows:

EXAMPLE 3

Preparation of Poly(oxybutylene) Glycol 25 g (278 mmol) of 2,3-butanediol and 100 ml of toluene were placed in a 1-liter, 3-necked flask equipped with a Dean-Stark trap, reflux condenser, mechanical stirrer and a nitrogen inlet. The mixture was heated under reflux to remove trace water in the diol. After cooling, 3.25 g (80 meq) of potassium was added and the mixture was stirred until the potassium dissolved. The trap was removed and an addition funnel attached. 500 g (6.94 mol) of 1,2-butylene oxide was added slowly and the mixture was heated to reflux until the overhead temperature reached 119° C. (37 hours).

200 ml of an acidic ion-exchange resin (Bio-Rad 50 W-X2) was added to the mixture and it was stirred for 1.5 hours. 200 ml of toluene was added to the mixture and water was removed by azeotropic distillation. The product was filtered to remove the resin, and the solvent was removed under reduced pressure. The resulting diol (482 g) had a hydroxyl number of 67 mg KOH/g.

EXAMPLE 4

Preparation of Poly(oxybutylene) Chloroformate 200 g of poly(oxybutylene) glycol (product of Example 3) was added to phosgene (66 g) in 150 ml of toluene at 0° C. The mixture was stirred for 2 hours a 0° C. and for 2 hours at 25° C. Excess phosgene was then removed by distillation. The resulting dichloroformate contained 7.74% chlorine (95% of theoretical) based on the hydroxyl number of the starting diol.

EXAMPLE 5

Preparation of Bis(N-aminoethyl) Carbamate of Poly(oxybutylene) Glycol

A 180-g portion of the product of Example 4 was diluted with toluene to form a 50% weight solution. Pumps were employed to meter the chloroformate solution (8 volumes) and ethylenediamine (1 volume) to a Komax Static mixing tube at a combined flow rate of 1200 ml/min. The resulting crude carbamate was purified by diluting with an equal volume of 1-butanol and washing with water (four 1000-ml portions) until the wash pH was 7. The butanol was removed under reduced pressure. The product contained 2.45% nitrogen (81% of theory based upon the chlorine content of the chloroformate). The compound is designated "Compound Y".

ASTM/CFR Single-Cylinder Engine Tests as described previously were performed on a series of additives formulated by combining the bis Compound Y of Example 5 with a poly(oxybutylene) ethylenediamine carbamate (Compound Z) in which the poly(oxybutylene) is capped with an alkylphenol group. The molecular weight of the capped polymer was 1475. The compound was prepared in essentially the same manner as set forth in Examples 1 and 2. Table II sets forth these data.

TABLE II

Intake Valve Deposit Tests on Combinations of Poly(oxybutylene) Amino Carbamates and Poly(oxybutylene) Bis(aminocarbamates)

| Run | Total Additive, ppm | Y, ppm | z, ppm | Average Washed Deposits, mg. | |
|---|---|---|---|---|---|
| | | | | 11a Engine | 12a Engine |
| 1 | 0 | 0 | 0 | 127[1] | 162[1] |
| 2 | 300 | 300 | 0 | 26[2] | 10[2] |
| 3 | 320 | 300 | 20 | 62 | 26 |
| 4 | 340 | 300 | 40 | 180[2] | 65[2] |
| 5 | 375 | 300 | 75 | 117[2] | 76 |
| 6 | 300 | 0 | 300 | 643 | 653 |

[1]Average of 8 runs
[2]Average of 2 runs

These data show that the bis-aminocarbamates are severely detrimental to deposit control characteristics in fuels.

The tendency of the additives to contribute to ORI was evaluated in a laboratory engine test. The test engine is a CLR single-cylinder, balanced, high-speed, four-cycle engine designed primarily for oil test and research work. It is manufactured by the Laboratory Equipment Corporation of Mooresville, Ind. The major engine dimensions are:

| Bore | 3.80 | In. |
|---|---|---|
| Stroke | 3.75 | In. |
| Displacement | 42.5 | Cu. In. |
| Compression Ratio | 8:1 | |

The carburetor, intake manifold, and distributor have been slightly modified to facilitate our test procedure. These modifications have made the engine's ORI characteristics comparable to modern day automobiles.

The test procedure involves engine operation for 80 hours (24 hours a day) on a prescribed load and speed schedule representative of typical vehicle driving conditions. The cycle for engine operation during the test is as follows:

TABLE III
Deposit Accumulation Cycle CLR Single Cylinder

| Mode | Time in Mode, Sec. | Manifold Vacuum, In. Hq | Engine Speed, rpm |
|---|---|---|---|
| 1. Idle | 140 | 16 | 900 |
| 2. Heavy Cruise, Low Speed | 70 | 7 | 2000 |
| 3. Light Cruise, Low Speed | 140 | 13 | 2000 |
| 4. Deceleration | 140 | 18 | 1800 |
| 5. Heavy Cruise, Low Speed | 70 | 7 | 2000 |
| 6. Light Cruise, Low Speed | 140 | 13 | 2000 |
| 7. Idle | 210 | 16 | 900 |
| 8. Heavy Cruise, Low Speed | 70 | 7 | 2000 |
| 9. Light Cruise, Low Speed | 70 | 13 | 2000 |
| 10. Heavy Cruise, High Speed | 70 | 9 | 2500 |
| 11. Light Cruise, High Speed | 140 | 15 | 2500 |
| 12. Deceleration | 140 | 18 | 1800 |

All of the test runs were made with the same base gasoline, which was representative of commercial unleaded fuel. The results are set forth in Table IV.

TABLE IV
Laboratory ORI Test Results

| Additive, Carrier Description | Concentration, ppm | Combustion Chamber Deposits, q | |
|---|---|---|---|
| — | — | — | 3.4 |
| Commercially available nitrogen-containing DC additive | 467 | — | 7.1 |
| Mineral carrier oil | 1600 | | |
| PPG-1800 EDA Carbamate* | 286 | 1.3 | 2.5 |
| PPG-1450* | 214 | | |
| PPG-1800 EDA Carbamate* | 286 | 1.6 | 2.4 |
| PPG-1450* | 214 | | |

*See TABLE I

Simple arithmetic averages of the results indicate: base fuel gives an ORI of 3.1 and combustion chamber deposits weighing 1.3 g, the commercial additives averaged 6.3 units ORI and had combustion chamber deposits weighing 2.1 g, and the polyether carbamates gave an ORI of 2.5 and combustion chamber deposits averaging 1.5 g. Generally, these results indicate that the polyether carbamates, which have been demonstrated to be excellent inlet system deposit control additives, do not contribute significantly to increasing octane requirements (over base fuel) of the engines in which they are employed.

The test for evaluating the ability of fuel additives to control carburetor deposits employs a 1973 model year, 240 CID, 6-cylinder Ford engine. The internal bore of the carburetor throttle body is equipped with a thin, removable aluminum sleeve. The difference between sleeve weights determined before and after an engine run represents the change in amount of surface deposit occurring during that run.

For additive evaluation, two test phases are run as set forth in Table V.

TABLE V
Carburetor Deposit Test Procedure

1. Dirty-Up Phase (Starting with Clean Sleeve

| | |
|---|---|
| Objective: | Establish deposits on carburetor sleeve. |
| Duration: | 15 hours. |
| Operating Cycle: | 7 minutes moderate load and speed, 4 minutes idle. |
| Engine Setup: | Crankcase blowby gases routed to carburetor air inlet. |

TABLE V-continued
Carburetor Deposit Test Procedure

| | |
|---|---|
| Fuel: | Deposit-forming fuel containing heavy FCC component. |
| Evaluation: | Sleeve weights are determined at the beginning and end of the dirty-up phase, and sleeve deposits are rated visually on a scale of 0 to 10 (10 = clean). |

2. Cleanup Phase (Begins with Sleeve Deposits Formed During Dirty-Up Phase

| | |
|---|---|
| Objective: | Measure additive performance in cleaning up deposits. |
| Duration: | 4 hours. |
| Operating Cycle: | Same as dirty-up phase. |
| Engine Setup: | Crankcase blowby cases diverted from carburetor inlet - EGR shutoff. |
| Fuel: | Commercial-type gasoline containing additive under test. |
| Evaluation: | The sleeve is reweighed and rerated visually. Differences between initial and final values represent additive effectiveness. |

Table VI presents average values for the performance of PPG-amine carbamate additives. Also, presented are values for a commercial deposit control additive having recognized performance in the field. Deposit level changes with a commercial-type unleaded gasoline without additive are also shown.

TABLE VI
Carburetor Test Results

| | | Average Additive Performance | | | |
|---|---|---|---|---|---|
| | | | Deposit Weight Reduction, % | Visual Deposit Ratings[1] | |
| | Runs | Concentration, ppm | | Initial | Final |
| PPG-1800 EDA Carbamate | 4 | 200 | 88 | 4.9[3] → 8.1[3] | 3.2[3] |
| Commercial Additive | 8 | 150 | 91 | 5.3 → 8.4 | 3.1 |
| None | 2 | — | 63 | 4.6 → 6.0 | 1.4 |

[1]Visual Deposit rating (10 = clean)
[2]see TABLE I
[3]Data for 3 runs only

These data show that the polyether carbamates are as effective carburetor deposit control additives as the recognized commercial additive.

The previously mentioned U.S. Pat. No. 3,359,303 discloses compounds similar in structure to the current compounds. However, by their nature they are limited to aminocarbamates of polyamines containing at least two alkylene groups and three or more nitrogen atoms, e.g., the derivative of diethylenetriamine. It has been found that the ethylenediamine derivative of this invention shows unexpectedly superior water-tolerance properties, an important consideration for use in fuels.

The following table shows the comparative water-tolerance properties for the ethylenediamine and diethylenetriamine compounds. Also, the water-tolerance properties of the 1,2-propylenediamine and di-(1,2-propylene) triamine derivatives are shown. The polyether in each case was butyl-capped polyoxypropylene material having a molecular weight of about 1483 and containing 25 oxypropylene units. The water-tolerance test is a modified Enjay Waring Blender Haze Test wherein 300 ml of fuel and 3 ml of water are mixed at 13,000 rpm for 30 seconds. The samples of both the water and fuel phases are rated from 1 to 5. For the water phase, 1 indicates free water after 30 minutes; 5 is total emulsion at 20 hours. For the fuel phase, 1 is bright and clear; 5 is extreme haze (no light passing through botttle). A rating of 3 is considered a marginal pass. The tests were run with and without a commercial demulsifier. The demulsifier was used at 5 ppm concentration. Table VII shows the results with and without demulsifier.

TABLE VII
Water Tolerance of Polyether Carbamate

| Amine | Water Phase | Fuel Phase 3 hrs | 20 hrs |
|---|---|---|---|
| Ethylenediamine | 3 | 2 | 1 |
| Ethylenediamine* | 1 | 3 | 1 |
| Diethylenetriamine | 3 | 4 | 1 |
| Diethylenetriamine* | 1 | 4 | 1 |
| 1,2-Propylenediamine | 1 | 2 | 1 |
| 1,2-Propylenediamine* | 1 | 3 | 1 |
| di-(1,2-propylenetriamine) | 1 | 2 | 1 |
| di-(1,2-propylenetriamine)* | 1 | 3 | 1 |

*Contains 5 ppm of commercial demulsifier

This shows that the ethylenediamine derivative is surprisingly superior to the diethylenetriamine derivative. Note that the propylenediamine and dipropylenetriamines were equivalent. Note also that the diethylenetriamine derivative fails to pass even with a demulsifier present.

All specific embodiments of the invention have been described in detail, and it should be understood that the invention is to be given the broadest possible interpretation within the terms of the following claims.

What is claimed is:

1. A hydrocarbylpoly(oxyalkylene) aminocarbamate having a molecular weight of about 600–10,000 and at least one primary or secondary amino group; wherein said hydrocarbylpoly(oxyalkylene) moiety is composed of oxyalkylene units selected from $C_2$–$C_5$ oxyalkylene units of which a sufficient number are branched-chain oxyalkylene units to render said carbamates soluble in liquid hydrocarbons; said hydrocarbyl group contains from 1 to 30 carbon atoms; and said amine moiety is derived from an ethylene diamine from 1 to 24 carbon atoms.

2. The hydrocarbylpoly(oxyalkylene) aminocarbamate of claim 1 wherein said diamine is substituted with substituents selected from (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C).

3. The hydrocarbylpoly(oxyalkylene) aminocarbamate of claim 1 having a molecular weight of about 1,200 to 5,000.

4. The hydrocarbylpoly(oxyalkylene) aminocarbamate of claim 1 wherein said oxyalkylene units are selected from $C_3$–$C_4$ carbon oxyalkylene units.

5. The hydrocarbylpoly(oxyalkylene) aminocarbamate of claim 4 wherein said oxyalkylene units are oxybutylene units.

6. The hydrocarbylpoly(oxyalkylene) aminocarbamate of claim 1 wherein said hydrocarbyl group is an alkyl or an alkylphenyl group.

7. The hydrocarbylpoly(oxyalkylene) aminocarbamate of claim 1 wherein said hydrocarbyl group is a butyl group.

8. The hydrocarbylpoly(oxyalkylene) aminocarbamate of claim 1 wherein said hydrocarbyl group is an alkylphenyl group of from 7 to 24 carbon atoms.

9. The hydrocarbylpoly(oxyalkylene) aminocarbamate of claim 8 in which said alkyl substituent is propylene tetramer.

10. A compound of the formula

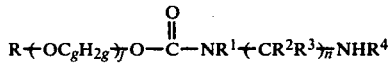

wherein n is 2, g is an integer from 2 to 5, j is an integer such that the molecular weight of the compound is in the range of about 600 to about 5,000, R is a hydrocarbyl group of from 1 to 30 carbon atoms; $R^1$, $R^2$, $R^3$, and $R^4$ are the same or different monovalent substituents selected from the group consisting of (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C); and at least a sufficient number of the oxyalkylene units, ($OC_gH_{2g}$), are branched-chain oxyalkylene units to render said compound soluble in liquid hydrocarbons.

11. The compound of claim 10 in which $R^1$, $R^2$, $R^3$ and $R^4$ are H, j is 5–25, and g is 4.

12. The hydrocarbyl poly(oxyalkylene) aminocarbamate of claims 1, 2, 3, 4, 5, 6, 7, 8, or 9 wherein the ethylene diamine is from 2 to 6 carbon atoms.

* * * * *